United States Patent [19]
Waaske

[11] 3,941,464
[45] Mar. 2, 1976

[54] MINIATURE MOTION PICTURE CAMERA

[75] Inventor: Heinz Waaske, Mascherode, Germany

[73] Assignee: Rollei-Werke Franke & Heidecke, Braunschweig, Germany

[22] Filed: Oct. 9, 1974

[21] Appl. No.: 513,499

[30] Foreign Application Priority Data
Oct. 13, 1973 Germany............................ 2351464

[52] U.S. Cl. .................... 352/72; 354/219; 354/223
[51] Int. Cl.² ......................................... G03B 23/02
[58] Field of Search ........ 352/72, 136; 354/219, 223

[56] References Cited
UNITED STATES PATENTS

| | | | |
|---|---|---|---|
| 1,264,842 | 4/1918 | Northrup | 354/219 X |
| 2,193,016 | 3/1940 | Wood | 352/72 |
| 2,198,417 | 4/1940 | Scheibell | 352/72 X |

Primary Examiner—Monroe H. Hayes
Attorney, Agent, or Firm—Stonebraker, Shepard & Stephens

[57] ABSTRACT

A small motion picture camera having a telescopic viewfinder enclosed in a separate housing which is mounted on the top of the camera body while the camera is being used for taking pictures. When not being used for taking pictures, the viewfinder housing is shifted to the front of the camera where it serves as a protective cover for the camera lens and a portion of the driving motor, thus reducing the height dimension of the camera to such extent that the camera can easily be slipped into the user's pocket of average conventional size. The length of the viewfinder housing is equal to the height of the camera body, and the thickness of the viewfinder housing from side to side is equal to the thickness of the camera body, so that when the viewfinder housing is mounted in the transporting position on the front of the camera body, it forms a smooth prolongation of the body. Batteries for powering the driving motor of the camera are also contained in the viewfinder housing, along with the viewfinder telescope.

7 Claims, 4 Drawing Figures

MINIATURE MOTION PICTURE CAMERA

BACKGROUND OF THE INVENTION

The invention relates to a small motion picture camera, especially one taking very narrow film (e.g. 8 millimeter film) supplied in a conventional film cassette readily available on the market. More particularly, the invention relates to such a camera having a telescopic viewfinder such as a reversed Galileo telescopic system.

In the conventional practice, the operating devices of the motion picture camera, such as the viewfinder, the range finder (if any) and the exposure meter are usually included in the camera housing, in order to render the housing smooth and compact. Such operating components are thus largely protected by the housing from outside influences. The lens system, with its focusing and diaphragm adjustment devices, are still unprotected, however, unless they are also incorporated in the housing by making the housing still larger. These larger dimensions of the housing, required for protecting the various devices and parts above mentioned, are a serious drawback even when every attempt is made to reduce the housing dimensions to a minimum, since it must be large enough, of course, to accommodate the film cassette in addition to the various other devices and parts above mentioned. The result is that the camera housing is frequently too large to fit conveniently in the user's pocket or in a lady's pocketbook.

An object of the invention is to provide a motion picture camera using narrow film supplied in a conventional cassette, so designed that when the camera is in the condition for being transported, it will have smooth outer surfaces of minimum dimensions and will enclose and protect the lens system and other vital parts which may be subject to damage by external contact, and may be rapidly made ready for photographic use when desired, with the lens system and the viewfinder in proper operative condition for making exposures.

SUMMARY OF THE INVENTION

The above mentioned object is achieved by placing the telescopic viewfinder, and preferably also the batteries which serve to power the motor, in a small housing separate from the main camera housing or body, the viewfinder housing being shiftable from a picture taking position resting on the upper edge of the camera body, to a transport position fitting on the front end of the camera body and forming a protective cap for the lens system and other parts or devices at the front of the camera.

In a particularly suitable and convenient version of the camera the width of the supplementary housing containing the viewfinder is identical with the width of the main camera housing or body, and the length of the supplementary housing is identical with the height of the main camera housing, so that when the supplementary housing is placed against the front of the camera body, the supplementary housing forms a prolongation of the length of the camera and the lateral surfaces of the supplementary housing form smooth continuations of the top, bottom, and side walls of the camera itself, being substantially flush therewith. A camera having these features, and using 8 mm motion picture film in a standard cassette commercially available on the market, can be made so small that it will fit into the palm of the hand, and can easily be carried in a person's jacket pocket of average or customary size, or in a lady's handbag.

If the supplementary housing containing the telescopic viewfinder contains also the batteries, as is preferably the case, then the connecting parts which serve to connect the supplementary housing to the camera body to hold the supplementary housing in proper position, may serve also as electrical conductors to convey the current from the batteries in the supplementary housing to the driving motor in the camera body. In one form of the invention these connecting parts are in the form of pins on the supplementary housing receivable in sockets on the top wall of the camera body when the viewfinder housing is in picture taking position on the camera, and removable completely from the sockets and placeable in other sockets on the front of the camera body when the viewfinder housing is mounted in the transport position, placed as a cap on the front of the camera body. In this form of the invention, the supplementary or viewfinder housing is completely detached from the camera body while it is being moved from one mounting position to the other mounting position. In another embodiment of the invention, the viewfinder housing is at all times physically connected to the camera body, by a sort of loose sliding hinge arrangement which permits the viewfinder housing to be slid along the top of the camera body and swung downwardly onto the front of the camera body, when shifting the supplementary housing from the picture taking position to the transporting position.

According to another advantageous feature of the invention, the base of the viewfinder housing is provided with one or more windows which coincide, in the operative position, with windows on the top of the camera body and through which various measuring values can be read, such as values or positions of the diaphragm indicator, the film counter mechanism, etc., and reflecting devices are provided where necessary in the viewfinder housing to permit these values to be seen through the eyepiece of the viewfinder.

DESCRIPTION OF THE PREFERRED EMBODIMENTS

Figure 1:
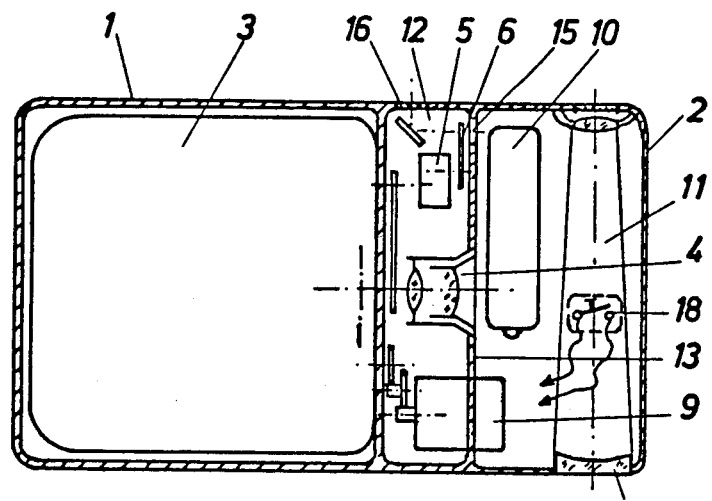
FIG. 1 is a schematic view partly in longitudinal vertical section and partly in elevation, of a motion picture camera in accordance with a first embodiment of the invention, illustrating the supplementary viewfinder housing mounted as a protective cap on the front of the body of the camera.
Figure 2:
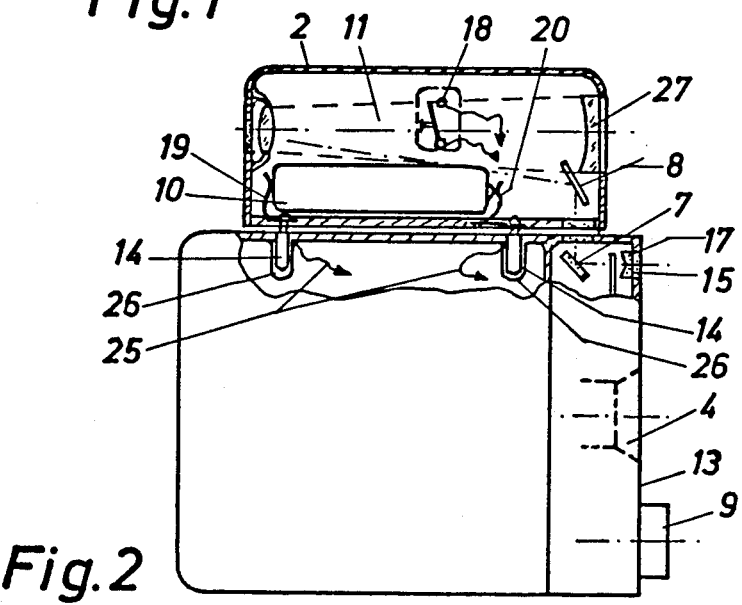
FIG. 2 is a view partly in side elevation and partly in vertical longitudinal section, of the same parts shown in FIG. 1, but with the supplementary viewfinder housing now mounted in operative or picture-taking position on the top wall of the camera body.

Referring first to FIGS. 1 and 2, the motion picture camera housing or body is indicated in general at 1, and the supplementary viewfinder housing is shown at 2. In FIG. 1, the viewfinder housing is mounted in the transport or carrying position, in the front of the camera body. In FIG. 2 it is mounted in the operative or picture-taking position on the top wall of the camera body.

The main space in the camera body or housing is taken up by the film cassette 3. All the devices or parts required for the film drive and the film exposure are accommodated in the front chamber 12 of the camera housing. These parts or devices include the lens system 4, the exposure mechanism 5, the measuring indicator 6, and the mirror 7 for reflecting an image of the indicator pointer or needle 6 upwardly through a window 16 in the top wall of the camera housing. The small electric driving motor 9 which drives the film advance and the shutter is also located partly in this front chamber 12, but the front end of the motor may stick out somewhat forwardly beyond the front wall of the chamber 12, as illustrated, in order that this chamber 12 may be made smaller, in a dimension parallel to the optical axis, than could be done if the entire motor were accommodated within the chamber 12. All of the above mentioned parts within the chamber 12 are made extremely small, in order to keep the over-all external dimensions of the camera housing as compact and moderate as possible.

Prior motion picture cameras have usually contained a viewfinder device in the camera housing, and this has increased the transverse cross sectional dimensions of the body. Prior art cameras have also usually had driving batteries generally accommodated in a camera handle, with further increase of the cross sectional dimensions. This increase in cross sectional dimensions is avoided according to the present invention by placing the viewfinder, and preferably also the batteries, in a separate supplementary housing which is carried on the top wall of the main camera body or housing only when the parts are in the operative or picture-taking position, at which time the increase in the height dimension of the camera, caused by placing the viewfinder housing on the top of the camera, is not detrimental and does not matter. When the camera is not in use, the supplementary housing containing the viewfinder and preferably also the batteries is removed from the top wall of the camera and placed on the front of the camera, forming a smooth continuation or prolongation of the length of the camera, so that the transverse cross sectional dimensions of the camera are now very small indeed, the cross sectional dimensions being governed mainly by the size of the conventional standard film cassette contained within the camera body. The cross sectional dimensions are so small, when the parts are arranged in this transport or carrying condition, that the camera may be easily slipped into a pocket of average size in a person's jacket, so that the camera may truly be called a miniature camera. In the carrying position, the extra length of the camera caused by placing the viewfinder housing on the front of the camera instead of on the top, is not a serious detriment, because it is the transverse cross sectional dimension of the camera which determines whether the article can be slid into a pocket of a garment, and the slight extra length of the article does not interfere with carrying the article safely in the pocket, if the cross section is sufficiently small to slide easily into the entrance opening of the pocket.

According to the invention, the supplementary housing 2 contains the viewfinder device 11, preferably in the form of a reverse Galileo telescope with a front lens 27. Also in this same supplementary housing 2, there are two driving batteries 11, held by the customary resilient retaining clips 19 and 20 which serve also as electrical conductors. The length of the supplementary housing 2 is equal to the height of the main body of the camera, and the width of the supplementary housing is equal to the width of the main body, so that when the supplementary housing is placed against the front wall 13 of the camera, it forms a smooth continuation of the camera body, making a flush prolongation of the top, bottom, and lateral side walls of the main camera body or housing.

Figure 4:
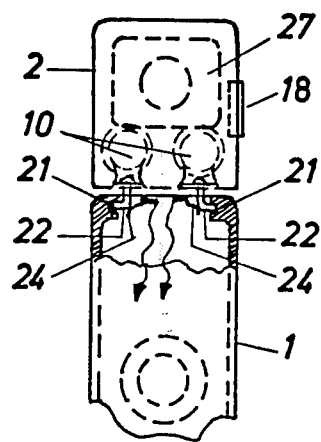
FIG. 4 is a fragmentary view, partly in front elevation and partly in vertical transverse section, showing further details of the embodiment illustrated in FIG. 3.

Suitable detachable securing means are provided, to enable the supplementary housing 2 to be held either against the front wall 13 of the camera housing, in the carrying position or transport position shown in FIG. 1, or on the top wall of the main camera body, in the operative or picture-taking position shown in FIG. 2. In the first embodiment of the invention, according to FIGS. 1 and 2, the detachable securing means is in the form of pins 14 attached to the supplementary housing 2, and sockets or bushings 26 in the main camera housing, into which the pins 14 fit and are frictionally retained. Preferably the pins 14 are electrically conducting, and are electrically connected to the batteries 10 through a finger-operated switch 18 (see also FIG. 4) on the side wall of the housing 11. The sockets 26 on the top wall of the camera body are likewise electrically conducting, and are connected through electrical connections indicated schematically at 25 to the driving motor 9. However, the corresponding sockets (not specifically illustrated) on the front wall 13 of the camera housing are not electrically connected to the motor. This arrangement has the advantage that when the viewfinder housing is mounted in operative position on the top of the camera, the batteries are automatically connected to the motor through the on-off switch 18, but when the viewfinder housing is removed from the operative position and placed on the front of the camera in the carrying or transport position, there is no electrical connection from the batteries to the motor, and the battery power will not be wasted nor will the motor be operated if the switch 18 is accidentally closed when the parts are in the carrying position. Thus no additional safety switch to prevent accidental operation is required.

The light measuring mechanism 5, of conventional known construction, receives light through the window 15 in the front wall 13 of the camera, when the viewfinder housing is in the operative position illustrated in FIG. 2. This light window 15 is provided with a diffusion lens 17. The conventional measuring unit 5, responding to the amount of light coming in from the subject to be photographed, through the window 15 and diffusing screen 17, moves the measuring indicator (pointer) 6 in the conventional way, in accordance with the light as measured by a photosensitive cell, this pointer or needle 6 being deflected to various positions behind the diffusion screen 17. The image of the pointer is reflected by the mirror 7, upwardly through the previously mentioned window 16 in the top wall of the camera, and through a corresponding aligned window in the bottom wall of the supplementary housing 2, onto another mirror 8 in the supplementary housing, which reflects the image rearwardly to the eyepiece of the viewfinder 11. When the user of the camera puts his eye to the eyepiece of the viewfinder in order to observe the scene, he sees also, at the bottom of his field of view, the image of the needle or pointer 6, and thus can determine whether there is sufficient light for photographing the desired scene, or whether some adjustment of variable factors may be necessary in order to assure a good picture. The diaphragm value, serving as a means for verifying the exposure and giving a warning of underexposure, can also be read, in known manner, on a diaphragm scale visible through the viewfinder window, and reflected by the same mirror arrangement 7, 8 which reflects the image of the light value or light intensity measuring pointer 6.

When the operator has finished the photographing operation for the time being, the supplementary housing 2 can be quickly and easily lifted off of the top of the camera, pulling the pins 14 out of the sockets 26, and then the supplementary housing can be placed on the front of the camera in the carrying or transport position, pushing the pins 14 into corresponding sockets (not illustrated) on the front wall 13 of the camera. In this position, the supplementary housing 2 serves as a protective cap for the front of the camera, protecting the lens system and also the protruding front end of the motor 9. As already mentioned, the camera is now of such small dimensions in a transverse cross sectional sense that it can easily be slipped into an ordinary pocket. It is but the work of a moment to remove the supplementary housing 2 from the front wall of the camera and place it on the top wall, which automatically establishes the necessary electrical connections for driving the motor.

Figure 3:
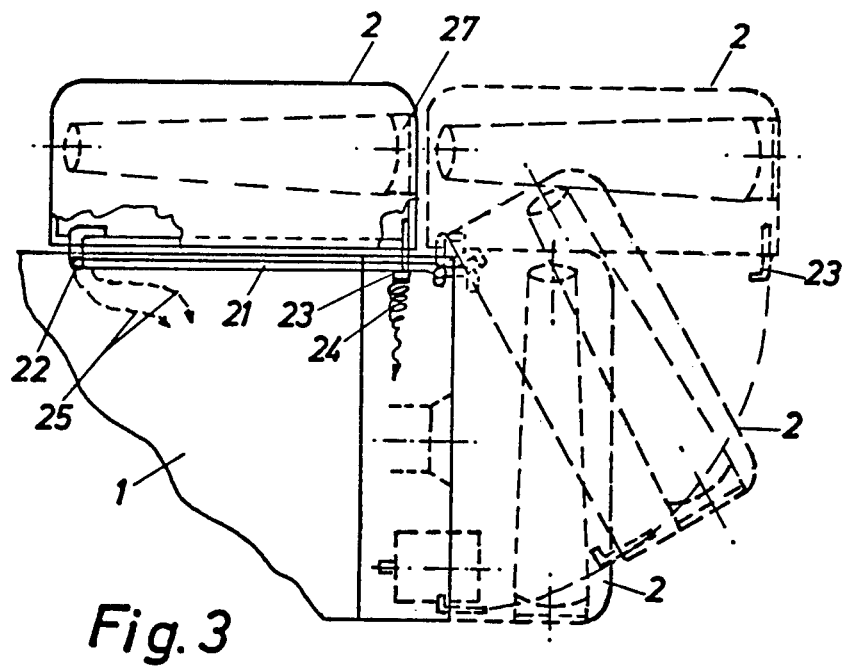
FIG. 3 is a fragmentary view similar to a portion of FIG. 2, illustrating a second embodiment of the invention, where the supplementary viewfinder housing is permanently attached to the camera body in a manner which permits the viewfinder housing to be slid along the top wall of the camera and swung down to a position against the front wall.

In this first embodiment of the invention (FIGS. 1 and 2) there is no permanent physical connection between the supplementary housing 2 and the main camera housing, so that supplementary housing can be completely separated from the main camera housing. In the second embodiment of the invention, now to be described in connection with FIGS. 3 and 4, there is a permanent physical connection between the viewfinder housing and the main camera body, so that the viewfinder housing cannot be completely separated from the camera, and cannot become lost.

According to this second embodiment, the top wall of the camera body is provided with two grooved bars 21, passing along the outer edges of the top wall and worked into the surface and covered over. Two short cylindrical guide pins 22 are provided near the eyepiece end (rear end) of the viewfinder housing 2, extending into undercut portions of the grooves in the bars 21, so that they can slide along the lengths of these grooves, but cannot become detached therefrom. At the other or forward end of the supplementary housing 2, there are two detent hooks 23, engaging into spring catches of conventional kind, schematically shown at 24, after the veiwfinder housing has been pushed as far as it will go rearwardly on the top wall of the camera; that is, pushed rearwardly until the guide pins 22 engage with the rear ends of the slots in the bars 21. In this rearward position, the engagement of the hooks 23 in the spring catches 24 serves to retain the viewfinder housing 2 in its operative position, and at the same time the detent hooks 23 and spring catches 24 make electrical contact with each other, and are parts of the circuit going from the batteries 10 and switch 18 to the motor.

When the picture taking operation is finished for the moment, and the camera parts are to be placed in transport or carrying position, the front end of the viewfinder housing 2 is lifted upwardly, disengaging the pins 23 from the catches 24. Then the viewfinder housing is slid forwardly, the guide pins 22 sliding along the grooves 21, until the guide pins reach the front end of the grooves, at the corner between the top wall and the front wall of the camera housing. When the parts reach this position (illustrated in broken lines in FIG. 3) the supplementary housing 2 can then be swung downwardly, the pins 22 acting as a hinge when they remain at the front ends of the grooves 21. The downward swinging continues as illustrated in broken lines in FIG. 3, until a full swing through 90° has been completed, whereupon the supplementary housing is tight against the front wall of the main camera housing, and the pins 23 are received in spring catches (not illustrated) in the front wall, similar to the spring catches 24 in the top wall, thereby retaining the supplementary housing in the carrying position.

Except for this feature of the way the supplementary housing is held in its two positions, on the top or on the front of the main camera housing, and remains permanently attached to the main camera housing at all times, the other features of this second embodiment of the invention are the same as the first embodiment above described.

What is claimed is:

1. A miniature motion picture camera comprising a body housing adapted to contain a film cassette, said body housing having a front and having a lens defining an optical axis, a viewfinder housing having a reversed Galileo optical system viewfinder therein, said viewfinder having an optical axis, and means for mounting said viewfinder housing on said body housing selectively in either one of two positions, in the first of which positions said viewfinder housing is mounted on said body housing with the optical axis of the viewfinder substantially parallel to the optical axis of the lens, so that said viewfinder may serve effectively as a viewfinder for taking pictures through said lens, in the second of which positions said viewfinder housing is mounted on the front of said body housing with the optical axis of the viewfinder extending transverse to the optical axis of the lens and with the viewfinder housing serving as a front protective cap for said body housing, the width and length of said viewfinder housing being substantially identical with the width and height, respectively, of said body housing, so that when said viewfinder housing is mounted in said second position on the front of said body housing, the lateral surfaces of the viewfinder housing are substantially flush with the lateral surfaces of said body housing.

2. A camera as defined in claim 1, wherein said body housing has a top wall, and wherein said viewfinder housing, when mounted in its said first position, is mounted on said top wall.

3. A camera as defined in claim 1, wherein said mounting means comprises a plurality of mounting members attached to said viewfinder housing, and retaining members on said body housing for receiving and retaining said mounting members.

4. A camera as defined in claim 1, wherein said mounting means comprises loose hinge joint means so formed that said viewfinder housing may be swung through an angle of 90° while being moved from one of its said positions to the other of its positions, and remains attached to said body housing during the entire movement from one position to the other position.

5. A miniature motion picture camera comprising a body housing adapted to contain a film cassette, said body housing having a front and having a lens defining an optical axis, a viewfinder housing having a reversed Galileo optical system viewfinder therein, said viewfinder having an optical axis, and means for mounting said viewfinder housing on said body housing selectively in either one of two positions, in the first of which positions said viewfinder housing is mounted on said body housing with the optical axis of the viewfinder substantially parallel to the optical axis of the lens, so that said viewfinder may serve effectively as a viewfinder for taking pictures through said lens, in the second of which positions said viewfinder housing is mounted on the front of said body housing with the optical axis of the viewfinder extending transverse to the optical axis of the lens and with the viewfinder housing serving as a front protective cap for said body housing, said viewfinder housing containing a battery mount, an electric driving motor in said body housing, said means for mounting said viewfinder housing on said body housing including means automatically establishing an electrical connection between said battery mount and said motor by the act of mounting said viewfinder housing in its said first position.

6. A camera as defined in claim 5 further comprising an on-off switch for said motor, said switch being mounted on said viewfinder housing.

7. A miniature motion picture camera comprising a body housing adapted to contain a film cassette, said body housing having a front and having a lens defining an optical axis, a viewfinder housing having a reversed Galileo optical system viewfinder therein, said viewfinder having an optical axis, and means for mounting said viewfinder housing on said body housing selectively in either one of two positions, in the first of which positions said viewfinder housing is mounted on said body housing with the optical axis of the viewfinder substantially parallel to the optical axis of the lens, so that said viewfinder may serve effectively as a viewfinder for taking pictures through said lens, in the second of which positions said viewfinder housing is mounted on the front of said body housing with the optical axis of the viewfinder extending transverse to the optical axis of the lens and with the viewfinder housing serving as a front protective cap for said body housing, indicating means in said body housing, window means in a wall of said body housing, window means in a wall of said viewfinder housing in a position aligned with said window means in said body housing when said viewfinder housing is mounted in its said first position on said body housing, and reflecting means in said viewfinder housing and said body housing for reflecting a beam of light from said indicating means through said window means to an observable position in said viewfinder housing.

* * * * *